United States Patent [19]

Livio

[11] Patent Number: 5,379,662
[45] Date of Patent: Jan. 10, 1995

[54] GEAR LUBRICATION

[75] Inventor: Andriolo Livio, Oggiono, Italy

[73] Assignee: Black & Decker Inc., Newark, Del.

[21] Appl. No.: 110,892

[22] Filed: Aug. 24, 1993

[30] Foreign Application Priority Data

Aug. 28, 1992 [GB] United Kingdom ............... 9218364

[51] Int. Cl.⁶ ............................................. F16H 57/04
[52] U.S. Cl. ................................................... 74/468
[58] Field of Search ........................ 74/450, 467, 468

[56] References Cited

U.S. PATENT DOCUMENTS 3,822,607  7/1974  Theraldsen .

FOREIGN PATENT DOCUMENTS

| 1902386 | 10/1970 | Germany . | |
|---|---|---|---|
| 2712065 | 12/1981 | Germany . | |
| 4-113064 | 4/1992 | Japan | 74/468 |
| 1376617 | 12/1974 | United Kingdom . | |
| 1647200 | 5/1991 | U.S.S.R. | 74/468 |
| 1654621 | 6/1991 | U.S.S.R. | 74/468 |

*Primary Examiner*—Allan D. Herrmann
*Attorney, Agent, or Firm*—Dennis A. Dearing; John D. Del Ponti; Charles E. Yocum

[57] ABSTRACT

A self-lubricating gear (20) has a deep circumferential groove (30) closed by an O-ring (42) seated on a shoulder (40) of the groove.

Teeth (36) of a meshing gear (38) squeeze the O-ring and release small quantities of lubricant contained in the groove to lubricate the meshing teeth.

8 Claims, 2 Drawing Sheets

GEAR LUBRICATION

BACKGROUND OF THE INVENTION

This invention relates to the lubrication of gears, particularly toothed gears. Such gears are used in many applications and to extend the life of meshing gears it is necessary to arrange for their lubrication during use.

It is, of course, well known to dispose meshing gears in a case which is filled with lubricant, either solid or liquid, which permanently bathes the gears and keeps them lubricated. However, it has long been recognised that, between meshing teeth of round gears only very small amounts of lubricant are required, and certainly much less than the amount which is usually packed into casings to ensure that the gears do receive lubrication where it is required between the meshing teeth.

It is known to provide a separate lubricating gear. In U.S. Pat. No. 3,822,607 a device for lubrication of tooth flanks is disclosed comprising a fi-eely running toothed wheel in which each tooth is provided with a plurality of radial passages each having one single outlet opening in the flank of the respective tooth and the inlet openings of said passages being successively brought in communication with a source of lubrication under pressure. Similarly, DE-C-2712065 discloses a felt rim on a gear wheel, the rim being saturated with lubricant and running against a toothed wheel adapted to receive lubricant from the felt rim. Both these methods require the provision of special gear wheels and in many circumstances, particularly, for example, in power tools, room for such additional gear wheels may not be available.

GB-A-1376617 discloses a self-lubricating gear having a circular groove around one side near its peripheral teeth, which groove is closed by a plate which, near to the teeth of the gear wheel, does not make a complete seal. Lubricant in the groove leaks out under the influence of centrifugal force and lubricates the teeth. Such an arrangement requires close tolerance parts and is not easy to assemble.

SUMMARY OF THE INVENTION

It is therefore an object of the present invention to provide a self-lubricating gear which does not suffer the foregoing disadvantages, or at least mitigates their effects.

In accordance with the present invention there is provided a gear which comprises a substantially disc-like wheel having teeth arranged around is periphery, characterised in that a deep groove runs through and below the teeth, the groove being adapted to receive lubricant and to be closed by an elastomeric ring, teeth on a meshing gear disturbing said ring and permitting lubricant to leak from said groove.

Preferably said ring is seated on a shoulder in said groove. Preferably said ring projects from said groove above the level of the bottom of said teeth.

BRIEF DESCRIPTION OF THE DRAWINGS

The invention is further described hereinafter, by way of example only, with reference to the accompanying drawings, in which:

FIG. 1b is a similar view to that shown in FIG. 1a but of a variation to the gear of that drawing; and, FIG. 2 is a section on the line II—II in FIG. 1a.

DETAILED DESCRIPTION OF THE PREFERRED EMBODIMENTS

Figure 1A:
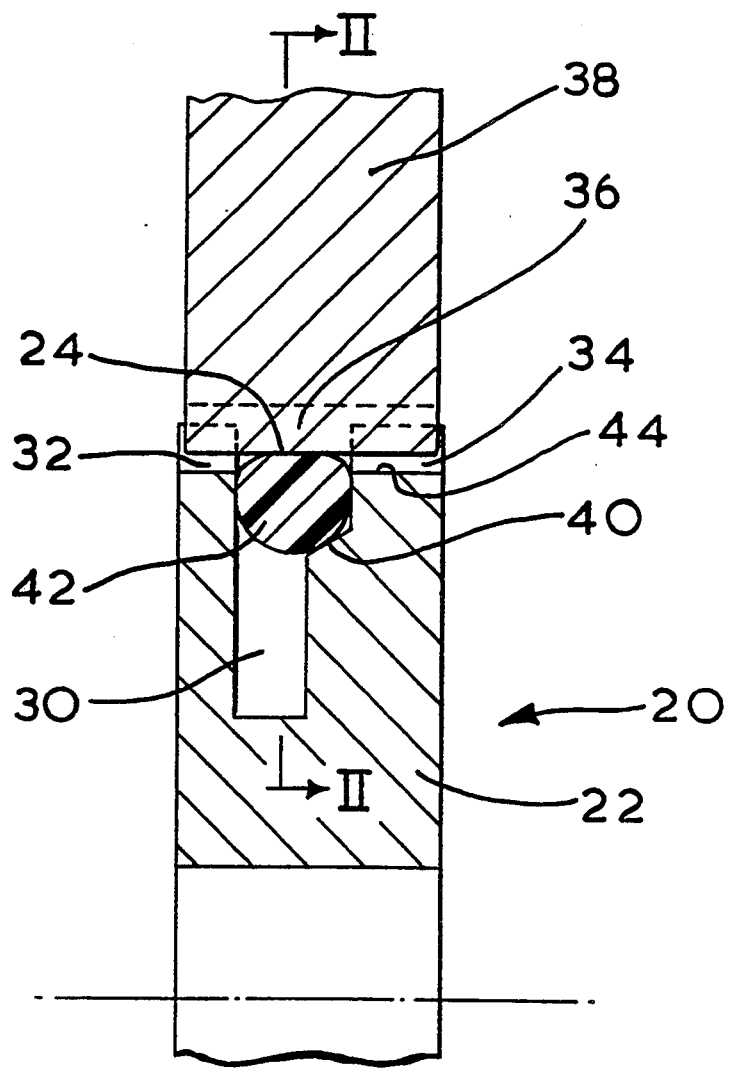
FIG. 1a is a section through a gear according to the present invention, taken along the line I—I in FIG. 2.

A gear 20 according to the present invention comprises a disc-like member 22 provided with a plurality of teeth 32,34 around its cylindrical edge. Between the teeth 32,34 is formed a deep circumferential groove 30 adapted to receive a lubricant such as grease or the like. The groove 30 is provided with a step or shoulder 40 adapted to seat an elastomeric O-ring 42 which thereby seals the groove 30. The O-ring 42 is sized and positioned so that its top edge 24 projects above the base 44 of the teeth 32,34.

An ordinary gear 38 meshes with the gear 20 and has teeth 36 which engage the teeth 32,34 of the gear 20. Where the teeth 36 mesh with the teeth 32,34, the teeth 36 contact and depress the top edge 24 of the O-ring 42. This results in a slight pumping action which results in lubricant in the groove 30 being slowly released towards the teeth 32,34.

The contact of the teeth 36 with the ring 42 also has a certain damping effect on the noise created by meshing teeth and hence reduces noise generation.

Figure 1B:
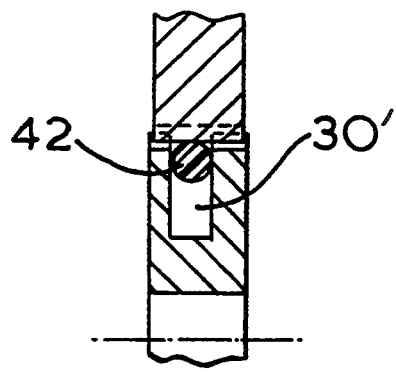
Figure 2:
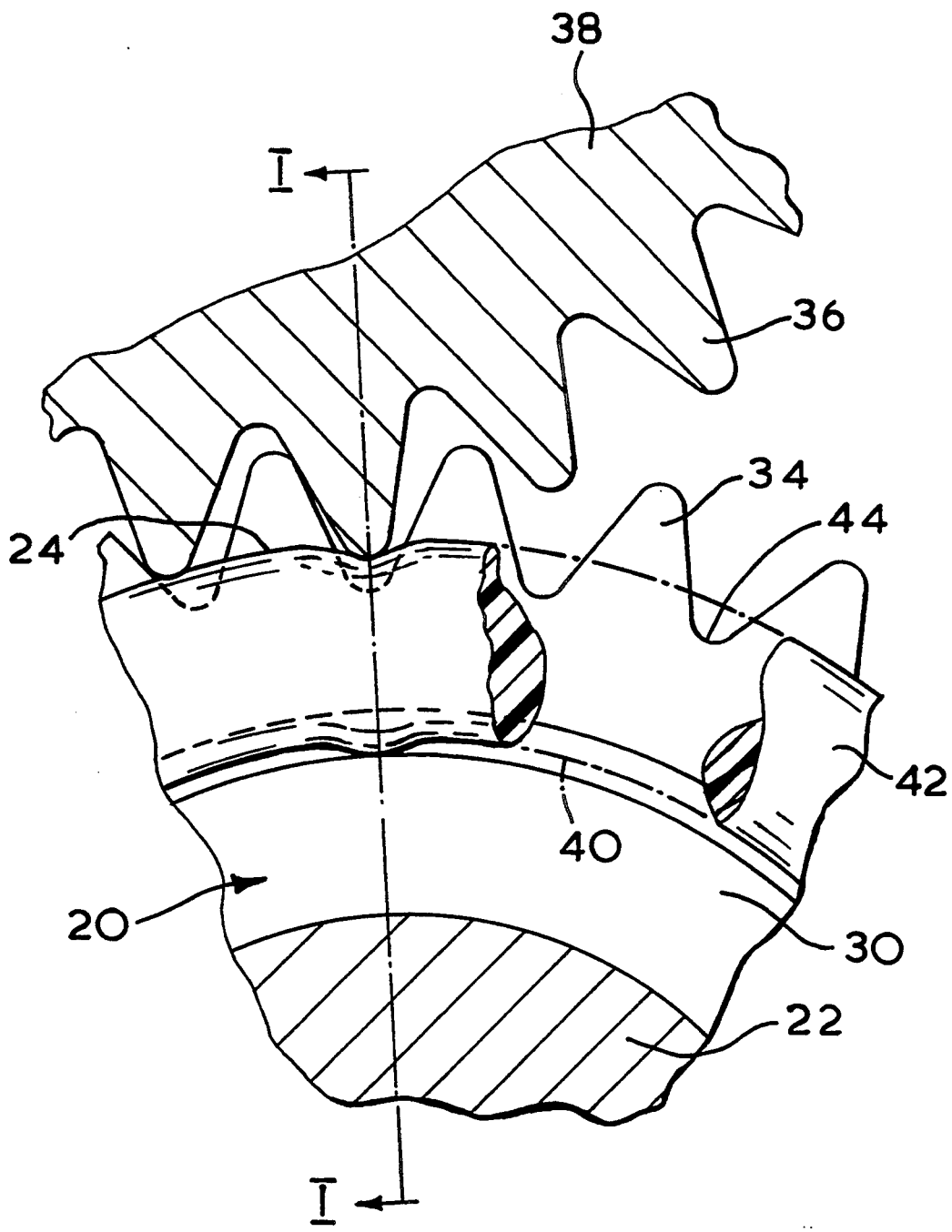

In FIG. 1b, a modification is shown in which the shoulder 40 is removed. Needless to say, this enlarges the space 36' and hence the reservoir of ease available. Consequently the grease runs out less quickly.

Although it may seem that the ring 42 can easily come adrift from the groove 30', this does not in fact occur, primarily because the grease in the space 30' holds the ring in position. So also does the meshing gear 36, and, once the ring is concentric with the gear 22, so also will centripetal force maintain the ring in position.

The noise reduction effect of the ring 42 may not be so noticeable in this embodiment.

I claim:

1. A gear comprising a substantially disc-like wheel having a periphery, teeth arranged around the periphery of the wheel, a groove running through and below the teeth and an elastomeric ring, wherein the groove receives lubricant and is closed by the elastomeric ring such that, when a meshing gear having teeth engages the gear, the teeth of the meshing gear disturb the elastomeric ring to permit the lubricant to leak from the groove.

2. A gear as claimed in claim 1, wherein a shoulder is formed in said groove, said elastomeric ring being seated on the shoulder in said groove.

3. A gear as claimed in claim 1, wherein said elastomeric ring projects from said groove above the level of the bottom of said teeth.

4. A gear comprising:
a wheel having a periphery;
teeth arranged around the periphery of the wheel;
a groove for receiving lubricant, running through and below the teeth and having sidewalls defining an opening;
a base of the teeth formed between each pair of adjacent teeth and
an elastomeric ring located in the groove, closing the opening and projecting above the base of the teeth.

5. The gear of claim 4 wherein:
a shoulder is formed in the groove; and
the elastomeric ring is seated on the shoulder in the groove.

6. A gear train comprising:
a first gear having a periphery;
teeth arranged around the periphery of the first gear;

a groove for receiving lubricant, running through and below the first gear teeth and having sidewalls defining an opening;

an elastomeric ring in the groove and closing the opening; and a second gear having teeth meshing with the first gear teeth and ring for disturbing the ring to permit lubrication to leak from the groove.

7. The gear train of claim 6 wherein:

a shoulder is formed in the groove; and the elastomeric ring is seated on the shoulder in the groove.

8. The gear train of claim 6 wherein:

a base of the first gear teeth is formed between each pair of adjacent first gear teeth; and the elastomeric ring projects above the base of the first gear teeth.

* * * * *